United States Patent
Mondal et al.

(10) Patent No.: US 8,205,032 B2
(45) Date of Patent: *Jun. 19, 2012

(54) VIRTUAL MACHINE CONTROL STRUCTURE IDENTIFICATION DECODER

(75) Inventors: Sanjoy K. Mondal, San Marcos, TX (US); Robert L. Farrell, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/069,690

(22) Filed: Mar. 23, 2011

(65) Prior Publication Data

US 2011/0173613 A1    Jul. 14, 2011

Related U.S. Application Data

(63) Continuation of application No. 10/876,509, filed on Jun. 25, 2004, now Pat. No. 7,937,525.

(51) Int. Cl.
 G06F 12/00 (2006.01)
 G06F 13/00 (2006.01)
 G06F 13/18 (2006.01)
(52) U.S. Cl. .......................................................... 711/6
(58) Field of Classification Search ........................ None
See application file for complete search history.

(56) References Cited

U.S. PATENT DOCUMENTS

| | | | |
|---|---|---|---|
| 4,682,288 A | 7/1987 | Taipale et al. |
| 4,814,975 A | 3/1989 | Hirosawa et al. |
| 5,005,118 A | 4/1991 | Lenoski |
| 5,446,854 A | 8/1995 | Khalidi et al. |
| 5,749,084 A | 5/1998 | Huck et al. |
| 5,815,724 A | 9/1998 | Mates |
| 6,292,882 B1 | 9/2001 | Zaidi et al. |
| 6,397,242 B1 | 5/2002 | Devine et al. |
| 6,959,379 B1 | 10/2005 | Wojcieszak et al. |
| 6,996,748 B2 | 2/2006 | Uhlig et al. |
| 2003/0018879 A1 | 1/2003 | Sahraoui et al. |

OTHER PUBLICATIONS

The Patent Office of the State Intellectual Office of the People's Republic of China, Fourth Office Action dated May 8, 2009, in a related application.
The Patent Office of the State Intellectual Office of the People's Republic of China, Fifth Office Action dated Sep. 4, 2009, in a related application.

*Primary Examiner* — Yaima Campos
(74) *Attorney, Agent, or Firm* — Trop, Pruner & Hu, P.C.

(57) ABSTRACT

Embodiments of apparatuses, methods, and systems for decoding a virtual machine control structure identification are disclosed. In one embodiment, an apparatus includes a virtual machine control structure to decode a virtual machine control structure identification data. The virtual machine control structure identification data is decoded into an address of a virtual machine control structure field and an offset. The offset is to help identify a micro-operation associated with a virtual machine architecture instruction to be executed.

17 Claims, 5 Drawing Sheets

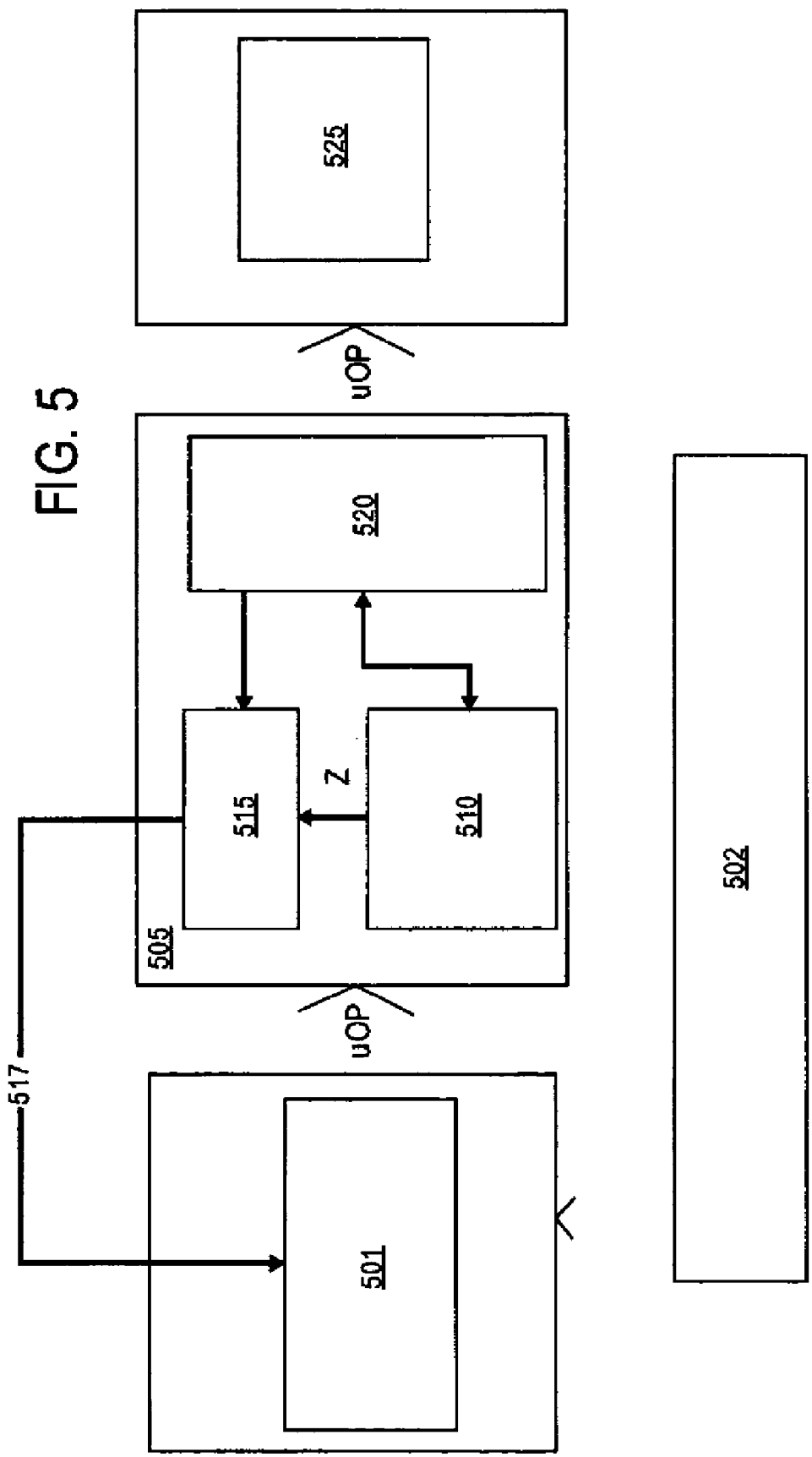

VIRTUAL MACHINE CONTROL STRUCTURE IDENTIFICATION DECODER

BACKGROUND

This application is a continuation of U.S. patent application Ser. No. 10/876,509, filed Jun. 25, 2004, which is now U.S. Pat. No. 7,937,525, issued on May 3, 2011, the content of which is hereby incorporated by reference.

FIELD

Embodiments of the invention relate to virtual machine extension (VMX) architecture. More particularly, embodiments of the invention relate to a method and apparatus to decode VMX instructions using a virtual machine control structure (VMCS) identification decoder.

BACKGROUND

Virtual machine extension (VMX) architecture allows multiple software programs and operating systems to use the same microprocessor logic ("hardware") by allocating processor resources to various software applications and operating systems at different times.

The VMX architecture typically uses a virtual machine monitor (VMM) program that interfaces one or more software programs, such as a virtual machine (VM), to a single microprocessor or collection of processing elements. The guest software running on each VM may include a guest operating system and various guest software applications. Furthermore, an application and operating system running on a VMM may be collectively called a VM or a guest.

Typically, each VMCS entry is identified by a unique identifier, rather than an architecturally defined memory address. In at least one prior art example, the VMCS identification (ID) is a unique 32-bit identifier.

Two instructions supported in the VMX architecture include, VMREAD and VMWRITE, which read and write data from/to VMCS entries, respectively. These instructions, when executed, can use the VMCS ID to locate the appropriate VMCS entry to read from or write to. However, the VMREAD and VMWRITE instructions are typically able to read/write varying sizes of data, which can cause the VMREAD and VMWRITE to incur processing time and resources to access. Further processing penalties may be incurred if the VMREAD and VMWRITE access data that is not accessible. VMCS data may not be accessible to a VMREAD or VMWRITE instruction for reasons, such as a VMCS entry containing a write-only or read-only data field, or the data may be generally inaccessible by these instructions.

The processing penalties incurred by a VMREAD or VMWRITE in the VMX architecture can cause the performance of a computer system to suffer as well. Furthermore, prior art VMCS ID decoding systems have failed effectively address this problem.

BRIEF DESCRIPTION OF THE DRAWINGS

Embodiments of the invention are illustrated by way of example and not limitation in the figures of the accompanying drawings, in which like references indicate similar elements and in which:

FIG. 5 illustrates logic according to one embodiment of the invention to decode a virtual machine control structure (VMCS) identification (ID) field.

DETAILED DESCRIPTION

Embodiments of the invention relate to virtual machine extension (VMX) architecture. More particularly, embodiments of the invention relate to improving execution performance of a VMREAD and VMWRITE instruction.

In order to improve processing performance in VMX architectures, embodiments of the invention improve upon the decoding speed of the virtual machine control structure (VMCS) identification (ID) field. In one embodiment of the invention, logic, which can be located within a processing element, such as a microprocessor, is used to improve the speed with which a VMREAD or VMWRITE instruction can access fields within the VMCS by exploiting information provided in the VMCS ID to which the fields correspond.

Figure 1:
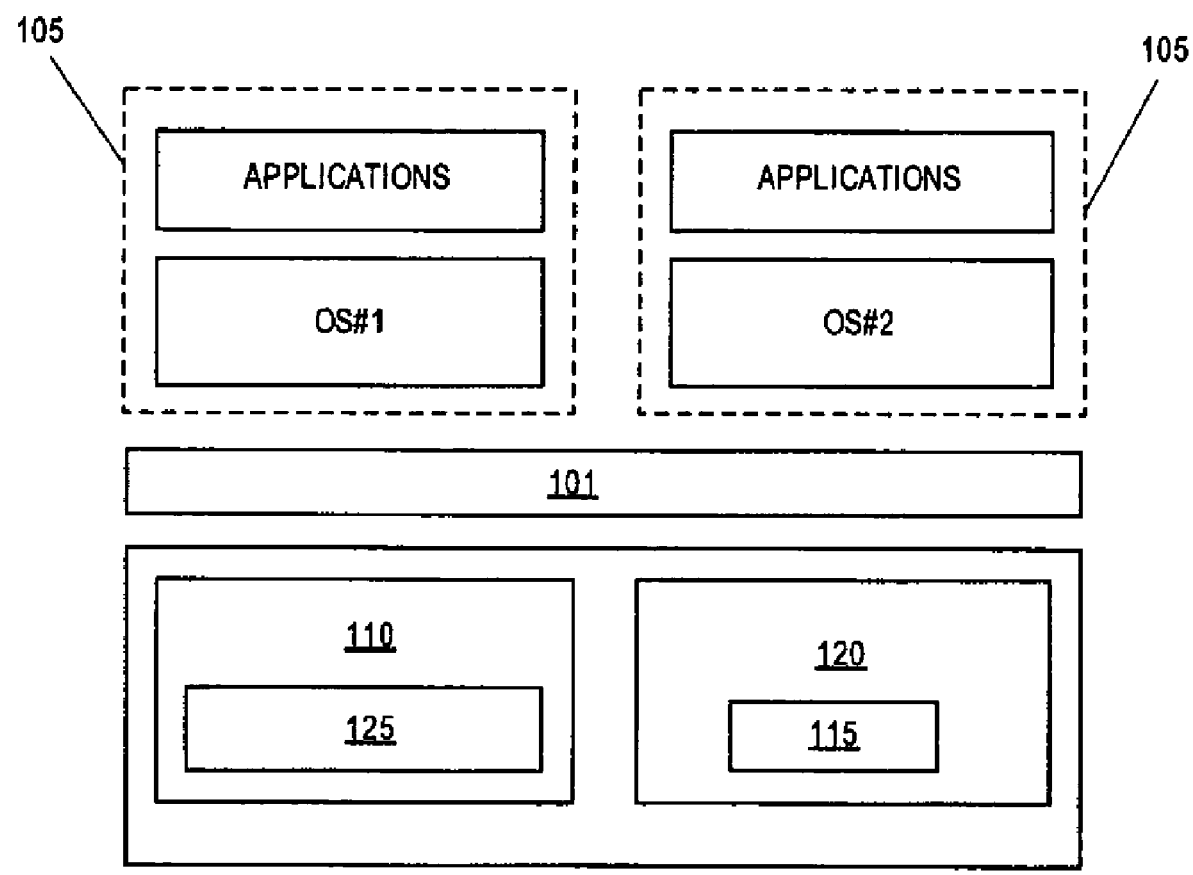
FIG. 1 illustrates a virtual machine environment, in which one embodiment of the invention may be used.

FIG. 1 illustrates a structure ("virtual machine environment") for interfacing guest software to a microprocessor. Specifically, FIG. 1 illustrates a virtual machine manager (VMM) 101 that interfaces two virtual machines (VMs) 105 ("guest software") to a microprocessor 110. The software running within each VM may include a guest operating system as well as various software applications. In order to interface each VM to processor resources, such as registers, memory, and input/output ("I/O") resources, state and control information is modified and otherwise tracked via a set of fields within a virtual machine control structure (VMCS) 115, which may reside in memory 120. More specifically, a control structure, such as the VMCS, is typically used to pass control of and access to processor resources between the VMM and a VM guest. At least one embodiment of the invention 125 may reside in the processor, whereas other embodiments may reside in other elements of the virtual machine environment.

Figure 2:
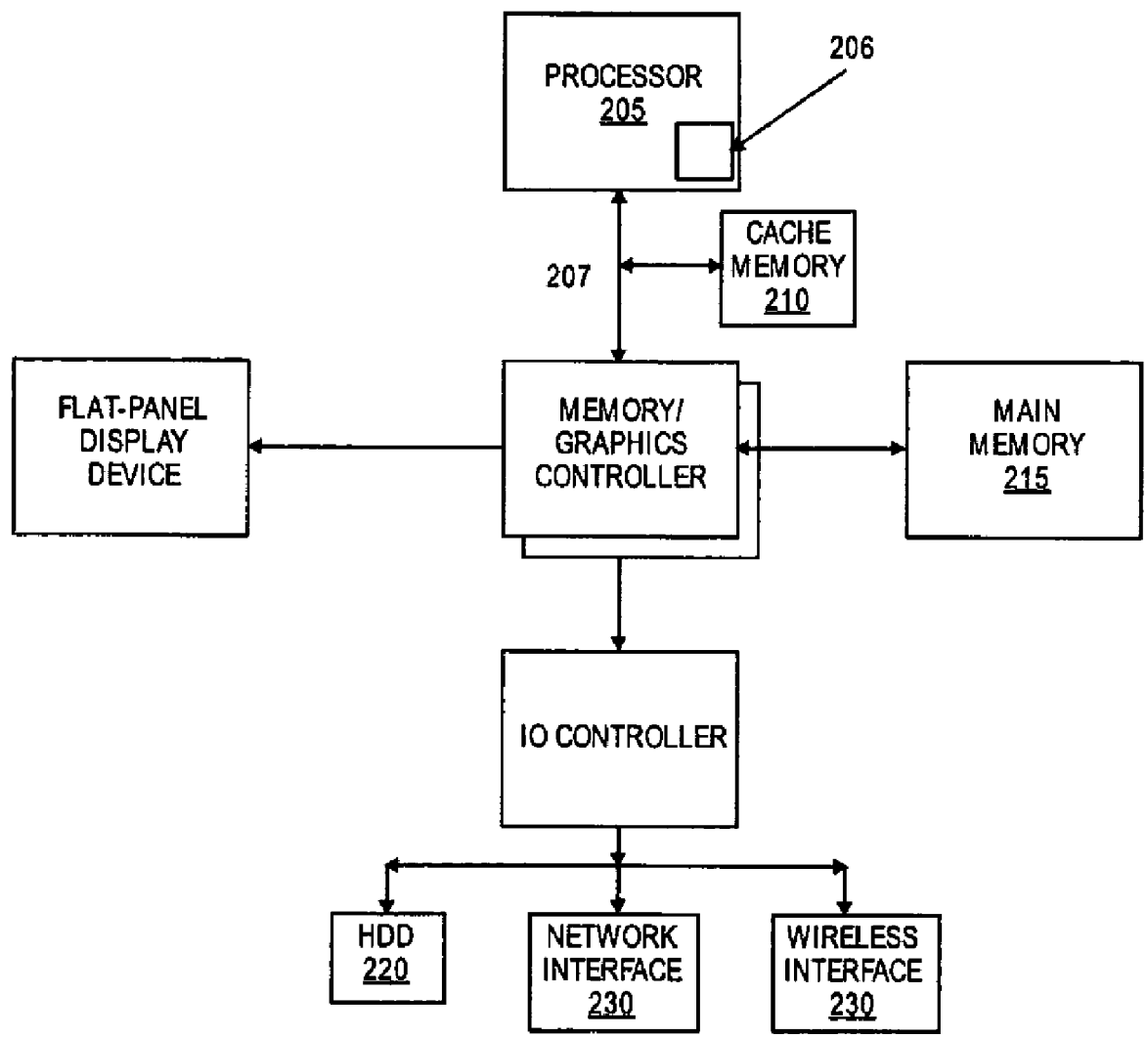
FIG. 2 illustrates a computer system in which at least one embodiment of the invention may be implemented.

FIG. 2 illustrates a computer system in which at least one embodiment of the invention may be used. A processor 205 accesses data from a level one (L1) cache memory 210 and main memory 215. In other embodiments of the invention, the cache memory may be a level two (L2) cache or other memory within a computer system memory hierarchy. Illustrated within the processor of FIG. 2 is one embodiment of the invention 206. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 220, or a memory source located remotely from the computer system via network interface 230 containing various storage devices and technologies. The cache memory may be located either within the processor or in close proximity to the processor, such as on the processor's local bus 207. Furthermore, the cache memory may contain relatively fast memory cells, such as a six-transistor (6T) cell, or other memory cell of approximately equal or faster access speed.

The computer system of FIG. 2 may be a point-to-point (PtP) network of bus agents, such as microprocessors, that communicate via bus signals dedicated to each agent on the PtP network. Within, or at least associated with, each bus agent is at least one embodiment of invention 206, such that store operations can be facilitated in an expeditious manner between the bus agents.

Figure 3:
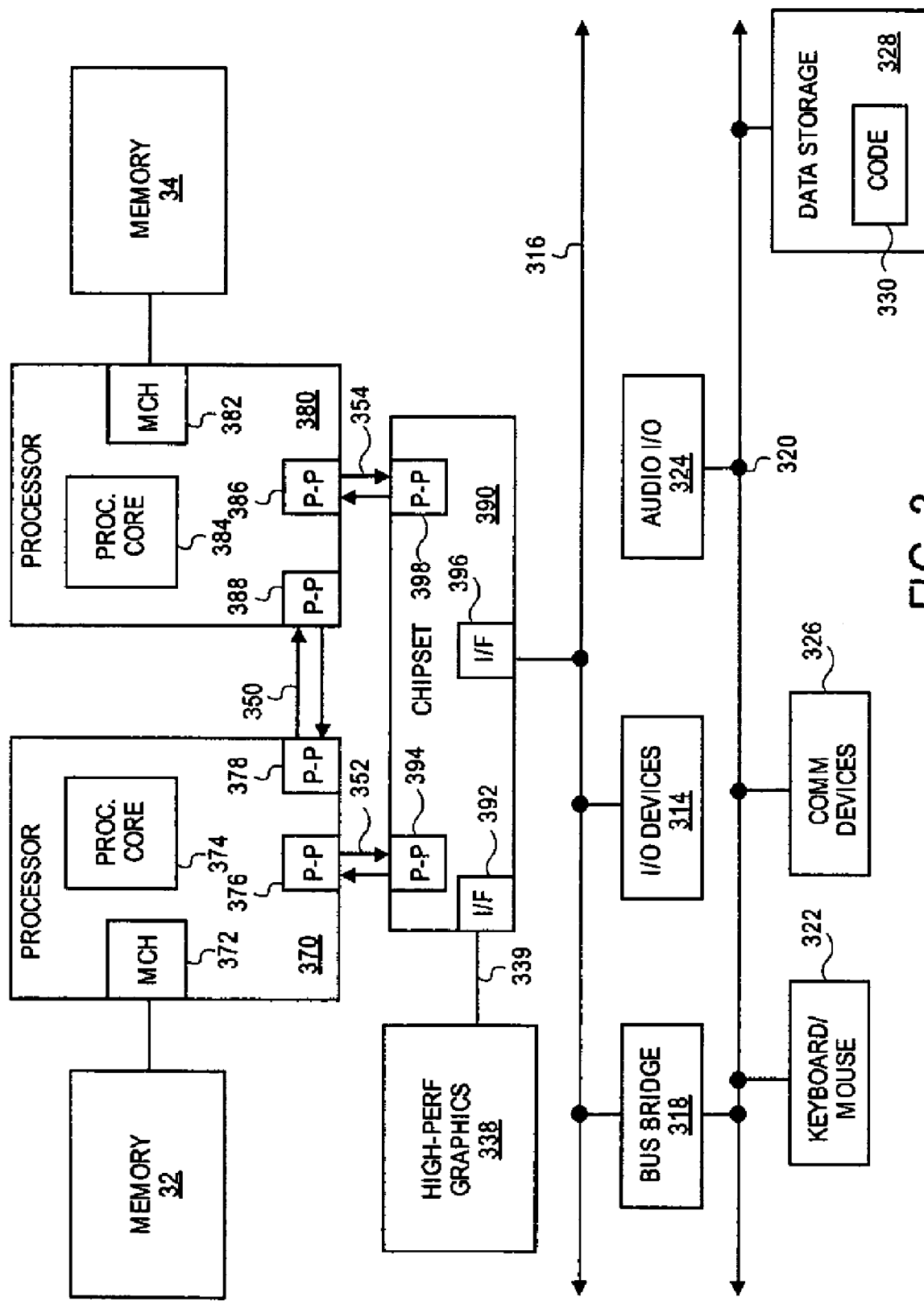
FIG. 3 illustrates a point-to-point (PtP) computer system in which one embodiment of the invention may be implemented.

FIG. 3 illustrates a computer system that is arranged in a point-to-point (PtP) configuration. In particular, FIG. 3 shows a system where processors, memory, and input/output devices are interconnected by a number of point-to-point interfaces.

The FIG. 3 system may also include several processors, of which only two, processors 370, 380 are shown for clarity. Processors 370, 380 may each include a local memory controller hub (MCH) 372, 382 to connect with memory 32, 34. Processors 370, 380 may exchange data via a point-to-point interface 350 using point-to-point interface circuits 378, 388. Processors 370, 380 may each exchange data with a chipset 390 via individual point-to-point interfaces 352, 354 using point to point interface circuits 376, 394, 386, 398. Chipset 390 may also exchange data with a high-performance graphics circuit 338 via a high-performance graphics interface 392.

At least one embodiment of the invention may be located within the CSI interface 372 382 of the memory controller hub or processors. Other embodiments of the invention, however, may exist in other circuits, logic units, or devices within the system of FIG. 3. Furthermore, other embodiments of the invention may be distributed throughout several circuits, logic units, or devices illustrated in FIG. 3.

In one embodiment of the invention, each field within the VMCS can be identified with a portion of a 32 bit identifier. Furthermore, some of the fields of the VMCS are accessible for various architectural reasons, some are read-only, others write-only. Moreover, some of the data within the fields contain 16 bit information, whereas others contain 32 bit or 64 bit information.

In order to accommodate varying VMCS field attributes, such as size and accessibility, embodiments of the invention are generic enough to provide improved VMCS ID decoding performance when a VMREAD or VMWRITE instruction is executed to access data sizes, such as 16, 32, and 64 bit fields. Furthermore, embodiments of the invention can improve performance of VMCS ID decoding for fields that are not accessible by instructions, such as VMREAD and VMWRITE, thereby allowing the system to absorb these cases more efficiently.

In one embodiment of the invention, VMCS ID decoding is improved by exploiting information within a VMCS ID to identify the location of the VMCS field addressed by a VMREAD or VMWRITE instruction. Furthermore, in one embodiment of the invention, the VMCS ID is exploited to decode the offset of the start of a micro-operation (uop) or uops within the VMREAD or VMWRITE instruction that is responsible for performing the read/write or signaling, such as for an invalid access.

Figure 4:
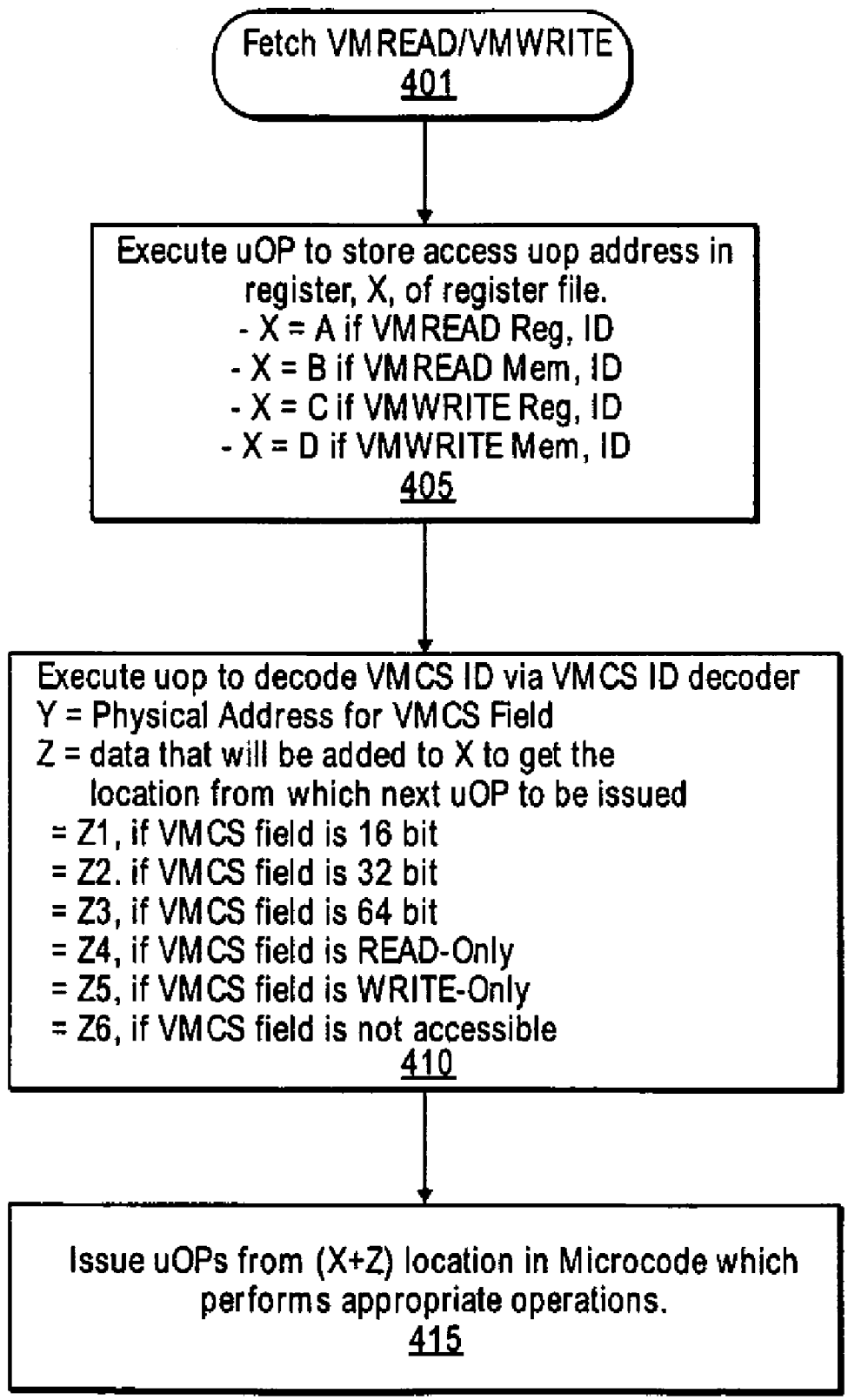
FIG. 4 illustrates a flow chart to illustrate the operation of a VMREAD or VMWRITE instruction according to one embodiment of the invention.

FIG. 4 is a flow diagram illustrating operations involved in one embodiment of the invention. After a VMREAD or VMWRITE instruction is fetched at operation 401, and the instruction is decoded into individual uops, a uop is executed at operation 405 that stores the location of the uop to be executed corresponding to the proper source/destination of the VMWRITE/VMREAD instruction.

For example, if the destination of a VMREAD instruction is to be a register, X is assigned a location of the uop that corresponds to reading VMCS data into a register. However, if the destination of a VMREAD instruction is to be memory, X is assigned a location of the uop that corresponds to reading VMCS data into memory. Likewise, if the source data for a VMWRITE instruction is to come from a register, X is assigned a location of the uop that corresponds to writing VMCS data from a register. However, if the source data for a VMWRITE instruction is to come from memory, X is assigned a location of the uop that corresponds to writing VMCS data from memory.

At operation 410, a uop is executed that causes the VMCS ID for a particular VMCS field to be decoded. In one embodiment of the invention, the decoding of the VMCS ID results in the determination of an address for the VMCS field ("Y") and an offset value ("Z") that can be added to X to determine the location of a uop or uops that will cause the read or write operation corresponding to the VMREAD or VMWRITE instruction, respectively, to be performed. After the sum of X and Z have been calculated, uops starting at the location in the uop sequencer corresponding to this sum can be executed at operation 415. Furthermore, at least one of the uops to perform the access to the target VCMS field may use the value, Y, to get the address of the field to access.

In order to implement at least one embodiment of the invention, such as the one illustrated by the flow diagram of FIG. 4, logic may be used for at least a portion of the embodiment. In other embodiments, some or all of the operations illustrated in the flow diagram of FIG. 4 may be done by instructions stored on a machine-readable medium (software), which when executed by a processor cause the processor to perform a method comprising operations illustrated in FIG. 4. In other embodiments, software and logic may be used together to perform operations illustrated in the flow diagram of FIG. 4.

FIG. 5 illustrates a processing logic, which includes a VMCS ID decoder, according to one embodiment of the invention, in which operations illustrated in the flow diagram of FIG. 4 may be performed. Specifically, the decoder of FIG. 5 illustrates a sequencer 501 to store and organize uops of instructions, such as VMREAD and VMWRITE, retrieved or "fetched" by instruction fetch interface 502. A uop or uops, such as the one referred to at operation 405 of FIG. 4, is issued from the sequencer to the execution unit 505, which contains a VMCS ID decoder 510 to generate an offset value Z, referred to at operation 410 of FIG. 4, to which X (referred to at operation 405 of FIG. 4) can be added by adder 515 in order to generate a pointer 517 to the next uop in the sequencer to be issued to the execution unit.

The VMCS ID is decoded into the address, Y, which references the target field of the VMREAD/VMWRITE instructions within the register file 520. In at least one embodiment, the address Y is used by uops that cause the target field to be accessed to identify the target field. Furthermore, in one embodiment, both Z and X are stored in the register file at a location corresponding to Y and later added to generate the starting point within the sequencer of the uops to access the desired VMCS field. After X and Z are added in the adder, thereby referencing the proper next uop to be executed in the sequencer, the proper read/write uop is executed and the desired data is either read or written, depending upon whether the instruction was a VMREAD or a VMWRITE. All uops are then retired by retirement logic 525.

In one embodiment of the invention, there is only five possible values of Z (as illustrated in FIG. 4), and if the VMCS ID does not correspond to one of these valid fields, then Y is undefined. If Y is undefined, meaning the field is inaccessible, Z will indicate an offset to a uop that will signal an invalid VMCS ID when executed. On the other hand, if Y contains a defined value, indicating that the field is accessible, Z will indicate an offset to the uop which will perform the VMCS access (read or write operation). Z added with X, will indicate a pointer to the proper uop to perform the desired operation.

Any or all portions of the embodiments of the invention illustrated herein may be implemented in a number of ways, including, but not limited to, logic using complimentary metal-oxide-semiconductor (CMOS) circuit devices (hardware), instructions stored within a storage medium (software), which when executed by a machine, such as a microprocessor, cause the microprocessor to perform operations described herein, or a combination of hardware and software. References to "microprocessor" or "processor" made herein are intended to refer to any machine or device that is capable of performing operations as a result of receiving one or more input signals or instructions, including CMOS devices.

Although the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a logic to decode a virtual machine control structure (VMCS) identification (ID) having a plurality of portions each to identify a field of the VMCS, wherein data stored within the fields is of varying size and accessibility, into an address of a VMCS field addressed by a virtual machine architecture instruction and an offset value to be added to a base address to identify a location of one of a plurality of micro-operations (uops) to be executed corresponding to a source/destination of the virtual machine architecture instruction wherein if the VMCS field address does not correspond to a valid value, the offset value is to indicate an offset to a uop to signal an invalid VMCS ID.

2. The processor of claim 1, wherein the offset value is based upon the size and the accessibility of the VMCS field, and a different offset value is to correspond to each different VMCS field size or accessibility value.

3. The processor of claim 1, further comprising a register file to store the VMCS field address and the base address.

4. The processor of claim 3, further comprising an adder to add the offset value to the base address to generate an address for the uop.

5. The processor of claim 4, wherein the offset value depends upon the size of the VMCS field and whether the field is able to be only read, only written, or is not accessible.

6. The processor of claim 1, further comprising a sequencer to store the uop and other uops associated with one or more virtual machine architecture instructions.

7. The processor of claim 6, wherein a sum of the base address and the offset value corresponds to a pointer to the uop stored in the sequencer.

8. A non-transitory storage medium including instructions that when executed cause a system to:
   fetch a first instruction from memory and decode the first instruction into a plurality of micro-operations (uops) including a first uop and a second uop;
   execute the first uop to store a base address for a location of an access uop corresponding to a source/destination of the first instruction;
   execute the second uop to decode a virtual machine control structure (VMCS) identification (ID) for a field of the VMCS into an address for the VMCS field and an offset value to be added to the base address to determine a location to cause an operation corresponding to the first instruction to be executed and add the base address and the offset value to determine the location of a uop of a plurality of uops associated with the first instruction to be issued, wherein each of the plurality of uops corresponds to one or more of a plurality of VMCS field attributes, the offset value is based upon the size and the accessibility of the VMCS field, and a different offset value is to correspond to each different VMCS field size or accessibility value.

9. The non-transitory storage medium of claim 8, wherein data stored in fields of the VMCS can be of varying size and accessibility.

10. The non-transitory storage medium of claim 8, wherein the instructions further enable the system to execute one or more uops starting at the location of the uop of the plurality of uops.

11. The non-transitory storage medium of claim 10, wherein at least one of the one or more uops is to use the address for the VMCS field to access a target VMCS field.

12. The non-transitory storage medium of claim 8, wherein the base address depends on whether the first instruction is to read data from the VMCS field to a register or a memory location.

13. The non-transitory storage medium of claim 8, wherein the offset value depends upon the size of the VMCS field.

14. The non-transitory storage medium of claim 13, wherein the offset value further depends upon whether the VMCS field can only be read, can only be written, or cannot be read or written.

15. An apparatus comprising:
   a hardware processor including:
      a sequencer to store and organize a plurality of micro-operations (uops) associated with a virtual machine architecture instruction; and
      an execution unit coupled to the sequencer and including a decoder to decode a virtual machine control structure (VMCS) identification (ID) data having a plurality of portions each to identify a field of the VMCS into a VMCS field address and an offset value, wherein the offset value is to identify which one of a plurality of uops associated with the virtual machine architecture instruction is to be executed, the offset value is based upon the size and the accessibility of the VMCS field, and a different offset value is to correspond to each different VMCS field size or accessibility value, a register file to store the VMCS field address and to store a base address of a first uop associated with the virtual machine architecture instruction, and an adder to generate a sum of the offset value and the base address to determine a location of the uop to perform an operation corresponding to the virtual machine architecture instruction, wherein an output of the adder is to be provided to the sequencer to identify a next uop to be executed; and a retirement unit coupled to the execution unit to retire uops.

16. The apparatus of claim 15, wherein each of the plurality of uops corresponds to one or more of a plurality of VMCS field attributes.

17. The apparatus of claim 15, wherein the base address and the offset value are to be stored in the register file at a location corresponding to the VMCS field address.

* * * * *